Dec. 11, 1928.

H. H. HICKS

METHOD OF MAKING PRESSED STEEL HUBS

Filed Oct. 10, 1925    2 Sheets-Sheet 1

1,694,779

INVENTOR
HARLIE H. HICKS
BY
Blackmore, Spencer & Flint
ATTORNEYS

Dec. 11, 1928.

H. H. HICKS 1,694,779

METHOD OF MAKING PRESSED STEEL HUBS

Filed Oct. 10, 1925    2 Sheets-Sheet 2

Inventor
HARLIE H. HICKS

By Blackmore, Spencer & Flint
Attorneys

Patented Dec. 11, 1928.

1,694,779

UNITED STATES PATENT OFFICE.

HARLIE H. HICKS, OF DETROIT, MICHIGAN, ASSIGNOR TO GENERAL MOTORS CORPORATION, OF DETROIT, MICHIGAN, A CORPORATION OF DELAWARE.

METHOD OF MAKING PRESSED-STEEL HUBS.

Application filed October 10, 1925. Serial No. 61,794.

This invention relates to a hub for a wheel, being intended more particularly to serve as a hub for a vehicle wheel.

It is an object of the invention to provide an improved hub and a method of making such a hub. A further object consists in making such a hub of pressed steel. The hub may with minor differences be made serviceable for a front steering wheel or for a rear driving wheel.

With the above generally stated objects in view, the invention resides in certain structure and methods, as set forth herein, it being understood that changes and modifications in details may be made within the scope of the claims.

In the drawing, Figure 1, is a vertical section through a front wheel of the vehicle employing the hub of this invention.

Figure 2, is a section on line 2—2 of Figure 1.

Figure 13:
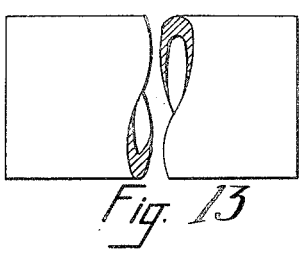

Figure 13 shows in elevation a piece of tubular stock from which the front wheel hub may be made.

Figure 14:
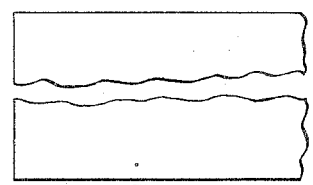

Figure 14, shows a piece of flat stock from which the tubular member of Figure 13 is made.

Figure 15:
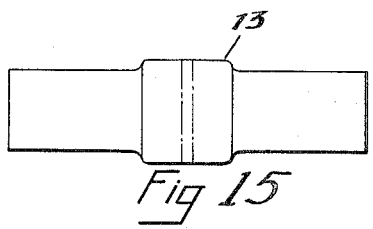
Figure 16:
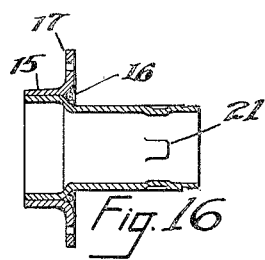
Figure 17:
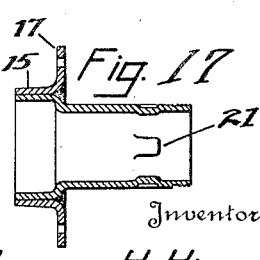

Figure 15 in elevation and Figures 16 and 17 in section show steps in the process of making the front wheel hub, the process involving a modification in the method of uniting the parts.

Figure 1:
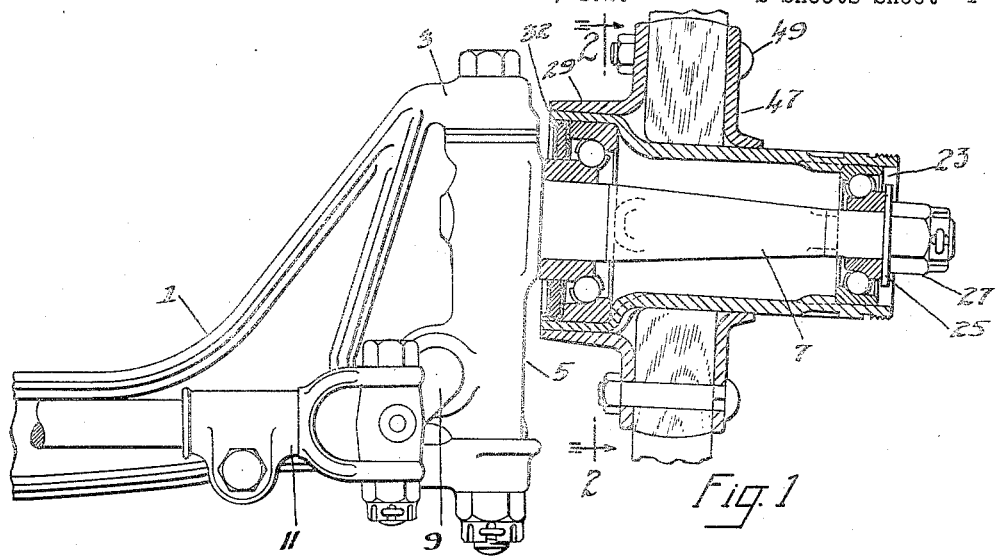
Figure 2:
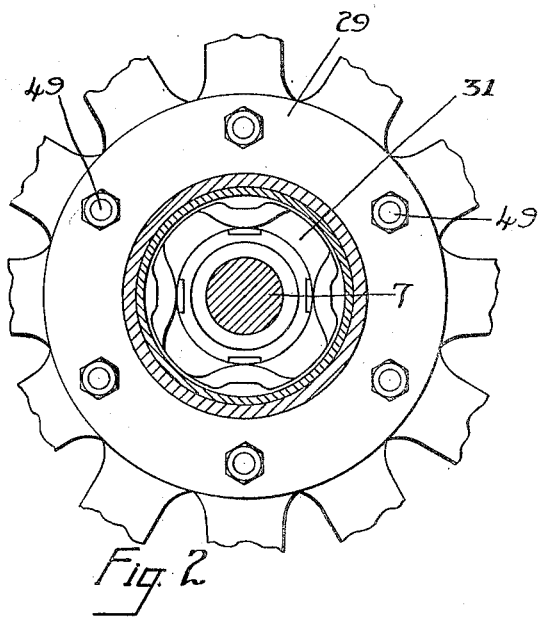

Referring to the drawing, and first considering Figure 1, numeral 1 represents an ordinary front axle with forks 3. Between the forks is mounted the usual steering stub 5, carrying wheel spindle 7. Steering is effected by the usual arm 9, and connecting rod 11. Upon the wheel axle 7 is mounted a wheel provided with the novel hub of this invention.

The hub is made up by a series of steps which will now be described.

Referring to Figure 14, there is shown a piece of flat material which is first converted into tubular form as in Figure 13. A suitable length of this tubular material is then expanded at its middle portion as at 13. At the mid portion of part 13, the tubular member is cut, thus forming two unfinished hub members.

At a plurality of positions about the inner circumference of the hub member, lugs 21 having flat faces are pressed into the hub to provide an abutment for the outer bearing race 23 of the usual ball bearing. The inner race is held by a washer 25 positioned by the usual nut 27 screwed upon the threaded end of the wheel axle. The inner wheel bearing has its outer race 29 in abutment with flat faced lugs 31, pressed into the wheel hub at that point where the expanded portion joins the part of lesser diameter.

As shown in Figure 16, a ring member 15 with flange 17 constituting the inner hub flange is placed over the enlarged part of the hub. A ring of bronze spelter 16 is placed over the hub at the angle of the ring member 15. Upon suitable application of heat, the spelter is melted and a firm union of the hub and ring is made as shown in Figure 17.

Instead of the spelter union as described, these parts may be united by a spot weld as shown at 32, in Figure 1.

Figure 3:
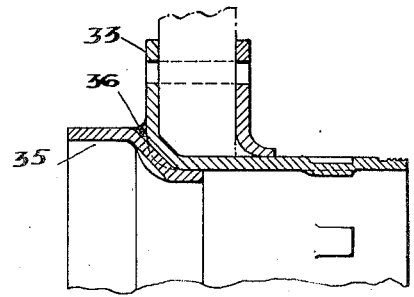
Figures 3, 4 and 5 are sectional details of modified forms.

In Figure 3, is shown a modification. Here the tubular member of Figure 13, is not expanded but is provided with a flange 33, substantially at right angles to the hub proper. Inserted into that end of the hub having the flange, is the reduced inner end of the tubular member 35, its portion of larger diameter being intended to serve as a housing for the inner bearing. The abutment for the inner bearing is in this case made from the part 35. An arc weld at 36 is made use of to secure the parts.

Figure 4:
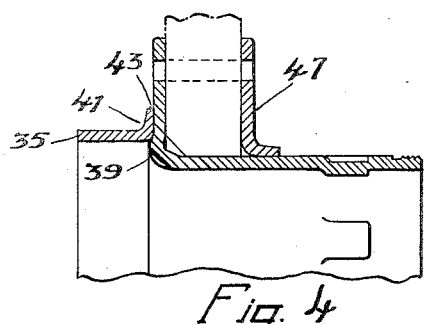

In Figure 4, a further modification is shown. By this modification a sharp angular bend is made between the hub and its integral angular flange. The projection to form the abutment for the inner bearing is made in this case from the hub face at the bend as at 39. Differing from Figure 3, this modification of Figure 4 shows the tubular part 35' having an outward flange as at 41, a metropolitan butt weld being made use of to secure the parts as indicated by numeral 43.

Numeral 47 represents a retaining member secured to the ring member 15 in the form shown in Figure 1, and to the angular part of the tubular hub in Figures 3 and 4, parts 49 and 50 representing the usual fastening bolt and nut.

Figure 5:
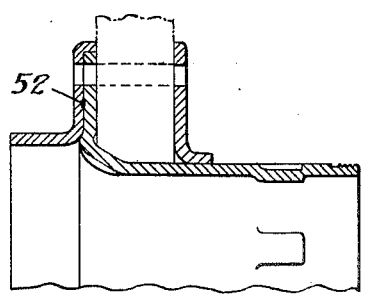
Figure 6:
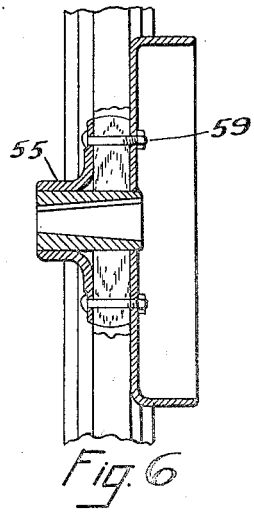
Figure 6 is a section through the hub of a form of the invention intended for use with the rear wheel.

In Figure 5, which shows a still further modification of the front wheel hub, the hub flange is of somewhat less extent than in Figure 4. The ring flange is of greater diameter and its edge is down-turned over the edge of the hub flange, as clearly shown. In this form of the invention, the bolt 49, passes through a retainer plate and spoke and both the hub flange and the inner ring flange. To secure the parts in this modification a circumferential series of spot weld connections is made, one being indicated by numeral 52.

The invention as applied to the rear wheels is illustrated in Figures 6 to 12 inclusive.

Figure 9:
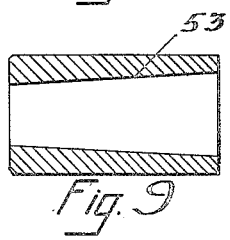
Figure 9 is a section through the tubular stock provided with a taper for use as in Figure 6.
Figure 11:
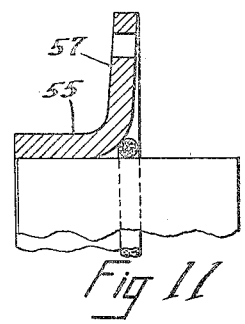
Figures 11 and 12 are two sectional views to illustrate steps in the process of making hub.
Figure 12:
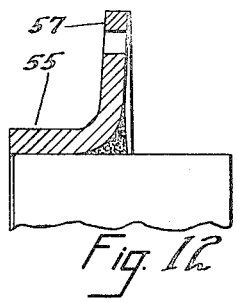

Starting with a proper length of heavy tubular stock, as in Figure 9 the inner diameter is given a taper 53 to adapt the hub to the tapered end of the driving axle. For engagement with the outer face of the spokes is a hub flange or ring member 55, having a flange as at 57, in Figure 10. This flange member is to be secured to the hub by means of a spelter ring such as has been described in one form of the front axle hub, the successive steps of which are shown in Figures 11 and 12. By a modification, ring 55 may be made with a circumferential series of small grooves shown somewhat exaggerated in Figure 8. Upon the suitable application of heat, the spelter melts and flows down the grooves and securely locks the hub to the driving ring. The brake drum completes the structure by constituting the abutment for the spokes of the inner side of the wheel the drum being held by bolts 59 passing through the ring spokes and drum.

Figure 7:
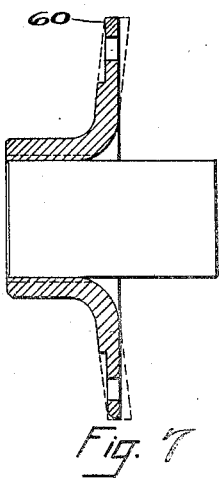
Figure 7 is a sectional view illustrating a method of making the hub.
Figure 8:
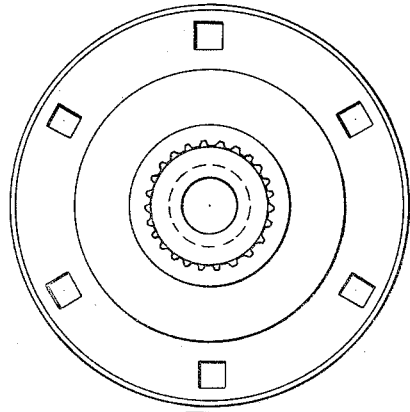
Figure 8 is a side elevation of the same hub showing a modification.
Figure 10:
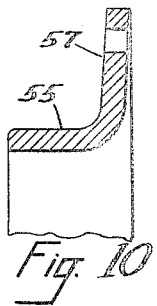
Figure 10 shows in section the hub member of Figure 7, before being prepared for use in the assembly.

In preparing the driving ring 55 for the wheel it will be seen by an examination of Figure 10 and by dotted lines in Figure 7 that the flange 57 would not lie flat against the spokes. The material of the flange of the spoke side is, therefore, cut away to secure the necessary flat face. The outer face is also cut away from its outer circumference to a point somewhat within the circle defined by the position through which the bolts are entered and the outer square corner is shown chamfered as at 60.

It will be obvious that this modification involving the use of the grooves may in the same way be used in the front hub arrangement. This method makes a very effective securing means and is quite easily carried out. The ring spelter is merely dropped over the axle and the heat of the furnace completes the work, no employment of skilled labor being required.

What I claim and desire to protect by Letters Patent is:

1. A method of making hubs from tubular material consisting in expanding the middle portion of the tubular material and cutting the tube at mid-length to make a pair of hubs.

2. A method of making hubs from tubular material consisting in expanding the middle portion of the tubular material and cutting the tube at mid length to make a pair of hubs, providing the hub with bearing engaging lugs and securing to said hub at its expanded end an angular flange.

In testimony whereof I affix my signature.

HARLIE H. HICKS.